[11] 3,573,613

| [72] | Inventor | Jacques Oswald<br>Versaille, France |
|---|---|---|
| [21] | Appl. No. | 780,850 |
| [22] | Filed | Dec. 3, 1968 |
| [45] | Patented | Apr. 6, 1971 |
| [73] | Assignee | C.I.T.-Compangnie Industrielle Des Telecommunications<br>Paris, France |
| [32] | Priority | Dec. 22, 1967 |
| [33] | | France |
| [31] | | 133,644 |

[54] DEVICE FOR THE MEASUREMENT OF TWO FREQUENCIES SIMULTANEOUSLY PRESENT IN A COMPLEX WAVE
3 Claims, 2 Drawing Figs.

[52] U.S. Cl. .................................................. 324/77
[51] Int. Cl. ............................................... G01n 23/16
[50] Field of Search ........................................ 324/77, 78

[56] References Cited
UNITED STATES PATENTS

| 3,215,934 | 11/1965 | Sallen............................ | 324/77 |
| 3,221,250 | 11/1965 | An Wang........................ | 324/78 |

*Primary Examiner*—Edward E. Kubasiewicz
*Attorney*—Edwin E. Greigg

ABSTRACT: A new process and devices for recognizing, in a received complex signal formed of two superimposed sinusoidal or quasi-sinusoidal waves of different frequencies each having a value selected from a predetermined range of values, the individual values assumed during a given time period by the said two frequencies, and to display these values in numerical form on an indicator, and or to direct a signal to one or the other of a number of addresses according to the received two-frequency combination. The process involves signal sampling and logical treatment of the samples.

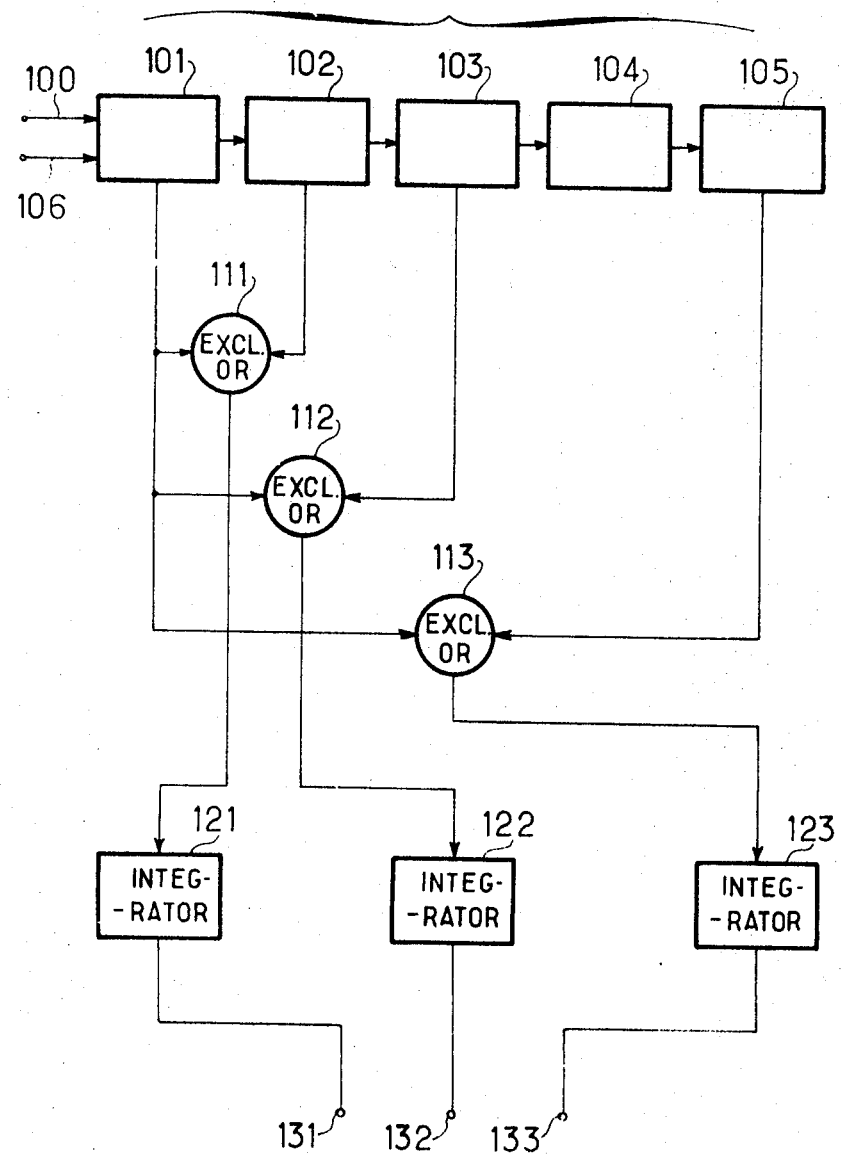

DEVICE FOR THE MEASUREMENT OF TWO FREQUENCIES SIMULTANEOUSLY PRESENT IN A COMPLEX WAVE

CROSS-REFERENCE TO RELATED APPLICATION

The present invention relates to new developments of the frequency measuring method proposed in the copending U.S. Pat. application Ser. No. 626,079, filed Mar. 27, 1967, now Pat. No. 3,514,697 in the name of the present applicant, and to a new field of application of the said method.

BACKGROUND OF THE INVENTION

1. Field of the Invention

The present invention relates to a new process and devices for recognizing, in a received complex signal formed of two superimposed sinusoidal or quasi-sinusoidal waves, of different frequencies but each having a value selected from a predetermined range of values, the individual values assumed during a given period of time by the said two frequencies, and to display these values in numerical form on an indicator, or also to direct a signal to one or the other of a number of addresses according to the particular combination of two frequencies recognized.

By quasi-sinusoidal wave will be understood in the following a periodic wave the instantaneous amplitude of which preserves one and the same polarity during each half-period.

The above-cited patent application related to a process for identifying a given frequency among a number $n$ of possible frequencies by a purely numerical method. The present invention concerns a process for identifying an assemblage of two simultaneously transmitted frequencies, also by a numerical method. These two frequencies may each have a value taken from a larger number of predetermined frequencies, or else may simply lie within the aforesaid range.

The usefulness of the invention will be better understood by the following application example.

It is known that certain systems of telephonic signalling employ a process in which two waves of different frequencies, selected from one or two groups of possible frequencies, are transmitted simultaneously. A known example is that of a keyboard telephone station, in which the numbering is effected by the simultaneous transmission of a frequency selected from a first group of three possible frequencies (1500, 1650, 1800 c/s) and a frequency selected from a second group of four possible frequencies (2200, 2350, 2500, 2650 c/s). There are thus 12 available combinations (10 would be sufficient for numbering purposes). Another also known case is that of signalling at multiple frequencies between certain telephone exchanges, between which it is possible to use, for example, a code consisting in transmitting two frequencies selected from six (700, 900, 1100, 1300, 1500, 1700 c/s).

2. Description of the Prior Art

The known technical means generally employed for the selection of such signals consist of linear frequency filters followed by amplifiers, detection systems and relays; in the case of keyboard telephone station, seven of these filters must be used, while six are necessary in the case of signalling between telephone exchanges.

The present invention makes it possible to eliminate entirely the relatively expensive and bulky linear filters, and to use exclusively in their stead logical circuits of quite ordinary pattern.

SUMMARY OF THE INVENTION

Like as in the above-cited patent application, the process according to the invention uses periodic sampling, with a given recurrence period, of the instantaneous amplitude of the received wave, conversion of the polarity of each sample into a binary signal having one of two values conventionally called hereinafter 0 and 1, according to the polarity of the said sample, and a logical treatment applied to a number of samples taken at instants spaced at predetermined time intervals. At the end of this treatment, the measured frequency values may be obtained in binary coded form.

The theoretical principles on which the operation of the devices of the invention is based will first of all be briefly explained.

It is well known that the superposition of two sinusoidal waves of different frequencies produces a phenomenon known as "beating," which is expressed not only by a periodic amplitude variation but also, at recurrent instants, by phase reversals of the resultant signal. These phase reversals, like the variations of instantaneous frequency, may be revealed by processes of numerical detection by sampling.

Considering in fact two sinusoidal waves $s_1(t)$ and $s_2(t)$ of equal amplitude $A_o$ and of respective frequencies $f_1$ and $f_2$ ($f_2 > f_1$), with the phases $\Phi_1$ and $\Phi_2$, one may write:

$$s_1(t) = A_o \sin(2\pi f_1 t + \Phi_1) \quad (1)$$

$$s_2(t) = A_o \sin(2\pi f_2 t + \Phi_2)$$

$t$ denoting the time taken as independent variable. Their superposition provides the resultant signal $s(t)$:

$$s(t) = A(t) w(t)$$
$$A(t) = 2A_o \cos\left[\pi(f_2 - f_1)t + \frac{\varphi_2 - \varphi_1}{2}\right]$$
$$w(t) = \sin\left[\pi(f_1 + f_2)t + \frac{\varphi_1 + \varphi_2}{2}\right] \quad (2)$$

The resultant signal $s(t)$ may be regarded as the product of a carrier wave $W(t)$ having a "carrier frequency" equal to the half-sum of the frequencies of the components:

$$F_1 = (f_1 + f_2)/2 \quad (3)$$

by an "envelope" $A(t)$ amplitude modulated at a frequency $F_2$ equal to the half-difference of the frequencies of the components:

$$F_2 = (f_2 - f_1)/2 \quad (4)$$

Formula (2) shows that the polarity of the carrier wave $w(t)$ changes periodically at each half-period $T_1 = 1/2 F_1$ of this carrier wave. Formula (2) also shows that since the instantaneous amplitude $A(t)$ of the envelope varies as $$\cos\left[\pi(f_2 - f_1)t + \frac{\varphi_2 - \varphi_1}{2}\right]$$

the polarity of this amplitude changes sign abruptly at each half-period, that is to say, at instants separated by the time interval $T_2 + 1/2 F_2$.

By making use of the properties which have just been described and which may be shown to be still valid, provided the amplitudes of $s_1(t)$ and $s_2(t)$ are not very different, the process of identification of the frequencies $f_1$ and $f_2$ according to the invention comprises four distinct stages:

1. Localization in time of the polarity reversals, other than those of the carrier wave of frequency $F_1$, by a numerical process; this permits the generation of an auxiliary signal $y(t)$ of rectangular wave form and frequency $F_2$.

2. Suppression of the periodic polarity reversals of the amplitude $A(t)$ of the signal $s(t)$ for obtaining a wave of frequency $F_1$, and numerical measurement of the frequency $F_1$.

3. Numerical determination of the "beat" frequency $F_2$ by analysis of the auxiliary signal $y(t)$.

4. Combination of coded signals numerically representing $F_1$ and $F_2$ obtained in the partial operations 2 and 3, for deriving therefrom other coded signals representing $f_1$ and $f_2$.

The process utilized according to the invention for the localization in time of those polarity reversals of the signal $s(t)$ which spaced by $T_2$ employs sampling of this signal at regular intervals of suitably selected value $T$.

The samples obtained at the two extremities of the same interval of duration $T$ are combined together to produce, at the end of this interval, a signal of binary value $a$ having the value 0 or the value 1 depending on whether these two samples have the same polarity or opposite polarities. A logical circuit performs, on the set of a whole number $q$ of the consecutive binary values of $a$ thus obtained, and also on the $p$ last obtained of the said $q$ values ($p$ being a whole number less than $q$), algebraic operations furnishing a binary signal, the value of which characterizes the existence or nonexistence, in the time interval $pT$ considered, of a polarity reversal of the amplitude of envelope $A(t)$.

From this new binary signal there is reconstituted a wave of mean frequency $F_x = (f_2 - f)/2$. By causing this wave to act on the initial mixture of frequencies $f_1$ and $f_2$ so as to suppress the periodic phase reversals of the carrier wave $w(t)$, due to the passage of the envelope $A(t)$ through zero, it is possible to obtain a wave of frequency $F_1 = (f_1 + f)/2$ free from such reversals. The measurement of frequencies $F_1$ and $F_2$ makes it possible finally to obtain, by addition and subtraction the frequencies $f_1$ and $f_2$ sought, according to formulas (3) and (4).

The manner in which the quantities $p$, $q$, $T$ should be selected will now be described more particularly.

Still denoting by $T_1$ the quantity $1/2F_1$ (that is to say $1/(f_1 + f_2)$), this quantity may assume, for the set of all possible values of $f_1$ and $f_2$, a maximum value $T_M$ and a minimum value $T_m$. The following condition must be satisfied:

$$pT < Tm < TM < qT \qquad (5)$$

The quotient $q/p$ must therefore be at least equal to $T_M/T_m$. It is furthermore desirable that the time interval $qT$ containing more than one minimum half-period $T_m$ of the frequency $F_1$, contains however less than one complete period of this same frequency. The ratios $T_M/T_m$ and consequently $q/p$ should, therefore, both be less than 2. This condition is furthermore satisfied in all the practical cases of application of the invention. Generally, therefore, one may write $$pT < T1 < qT2T_1 \qquad (6)$$

The choice of values expressed by the relationship (6) evidently also limits the possible variations of the frequency $F_1$ to be measured to a ratio between extreme values equal to $q/p$.

Due to this choice, as long as there is no time interval $qT$ of polarity reversal due to $A(t)$ in the signal $s(t)$, no changes in polarity can be found by sampling during the time interval $pT$, this interval being less than the half-period $T_1$ of the carrier wave $w(t)$; likewise, it is not possible to find, in the absence of a zero of $A(t)$, with the same interval $T$ between successive samples, $q$ consecutive coincidences of polarity, since $qT$ is greater than $T_1$, and there is therefore at least one polarity reversal of $w(t)$ during this interval $qT$.

The foregoing considerations make it possible to design logical circuits revealing the polarity reversals of period $T_2$ of the amplitude $A(t)$.

Denoting by $x_1$, $x_2$,...$x_k$ the successive binary values attributed according to their polarity to the successive samples, taken with a recurrence period $T$, of the wave $s(t)$, assumed to be strongly limited in amplitude before sampling, the comparison of the polarities of two samples taken consecutively is effected by forming the logical sum $$a_i = x_i \oplus x_{i+1} \qquad (7)$$

where the sign $\oplus$ denotes the "modulo 2" addition. The quantity $a_i$ may therefore assume the value 0 or the value 1.

It is easy to see that the sequence of the values $a_1, a_2...a_q$, assumed by the value $a$ during the time interval $qT$ and numbered in the reverse order of that of their respective appearances, is characterized by the following property:

When a polarity reversal due to the envelope $A(t)$ appears in the signal $s(t)$, three cases may arise:

1. either this reversal takes place in a time interval of duration $T$ included in the $p$ last elementary intervals of $qT$, during which the carrier wave $w(t)$ of frequency $F_1$ does not itself assume zero amplitude;

2. or it takes place in this time interval of duration $T$ where there already exists such a passage through zero of the carrier wave $w(t)$ of frequency $F_1$;

3. or again it takes place during the duration of $(q-p)$ first elementary time intervals of duration $qT$, the conditions (1) or (2) being able to exist in this latter duration instead of existing in the duration $pT$.

It is evident that the case (3) is reduced to the cases (1) and (2) by means of an advance $pT$ of the observation period relative to what occurred in the cases (1) and (2).

Reverting to the first case, and denoting by $a_1$, $a_2$..., $a_p$ the consecutive binary values of the quantity $a$ taken between the extreme instants comprising the polarity reversal, one evidently has:

$S = a_1 a_2 a_3 + ... + a_1 a_p = 1$ because the relationship (7) shows that at least two of the quantities $a_1, a_2...a_p$ differ from zero.

In the second case, on the contrary, we find for the quantity $a$ a sequence of $q$ consecutive zeros; whence $$S = 0$$

at the same time that we have $$P = \bar{a}_1 \bar{a}_2 ... \bar{a}_q = 1$$

the quantities $\bar{a}$ being complementary to the quantities $\bar{a}$ in the sense of Boolean algebra, and consequently being all equal to 1.

Generally, in the first and in the second case, the relationship $$S + P = 1 \qquad (8)$$

characterizes the passage of $A(t)$ through zero during the time interval $pT$.

The foregoing shows that the processes just explained always reveals the occurrence of a zero of $A(t)$, but with a certain time displacement, which may attain $pT$ in the first case examined above, and $(q-p)T$ in the second case. As $q$ is selected to be less than $2p$, it may therefore be affirmed that the uncertainty regarding the position in time of the zero of $A(t)$ will therefore be $pT$ at the most. This displacement may furthermore be reduced by appropriate means which will be described later.

It is scarcely necessary to point out that it is impossible in any case to have simultaneously $S=1$ and $P=1$.

It remains to be shown that the zeros of $A(t)$ being thus revealed, although with time intervals not strictly equal to $T_2$ but differing therefrom at the most by $pT$ and therefore at the most by $T_1$ ($T_2$ in practical applications is usually much greater than $T_1$), the same zero of $A(t)$ cannot be signalled twice or more in a short time interval, or at least that it is possible to construct a device in which this signalling repeated in a short term causes no disadvantage.

In fact, a careful study shows that when the same zero of $A(t)$ is signalled several times, the successive signallings have occurred in the course of several consecutive intervals. Under these conditions, it is possible to ensure by known means continuity of the indication $S+P=1$ transmitted by a logical circuit, the quantity $(S+P)$ not returning, even instantaneously, to zero value during the passage from one of the said elementary intervals to the next.

The instants of passage through zero of $A(t)$ having thus been localized, which forms the first stage of the process of the invention, the second stage consists in acting on the received signal $s(t)$ for suppressing the polarity reversals of $A(t)$ which have taken place at the instants in question. For this purpose, a logical circuit controlled by the quantity $(S+P)$ develops a rectangular wave $Y(t)$, the instantaneous amplitude of which has alternately the values 0 and 1 (or possibly +1 and −1) in the rhythm of the polarity reversals of $A(t)$, and there is formed, by means of a modulator, the product by $y(t)$ or of a series of polarity samples derived from $s(t)$, and of a series of samples taken periodically of the signal $s(t)$, which has the effect of suppressing the aforesaid phase reversals and of transforming the signal $s(t)$ into a new signal $S_1(t)$ no longer possessing polarity changes except at recurrent instants separated by the time interval $T_1=1/2F_1$. The frequency $F_1$ of the bipolar signal $S_1(t)$ thus obtained may then be measured by any known means.

It is necessary to point out, however, that the correction of the polarity reversals of $s(t)$ which transforms $s(t)$ into $S_1(t)$ is not always produced exactly at the instants of the zeros of $A(t)$, but may occur at slightly different instants which may be displaced from the preceding instants, as already mentioned, by an interval equal at the most to $pT$. This amounts to saying that there exist intervals of short duration during which the corrected signal $S_1(t)$ is disturbed. Practically no disadvantage results therefrom, if care is taken to use for measuring the frequency $F_1$ of $S_1(t)$ a process comprising an integration over a long period or an automatic correction of the disturbances of short duration. Such a process is described in the patent application already mentioned, and is applicable owing to the fact that $pT$ is less than $T_1$, which itself in practice is much smaller than the spacing $T_2$ of the zeros of $A(t)$, since the quantity $T_1$ is equal to $1/(f_1+f_2)$ and the quantity $T_2$ to $1/(f_2-f_1)$. This spacing $T_2$ is furthermore itself generally much smaller than the duration during which the wave $s(t)$ is received.

The measurement of $F_2$ (frequency of the rectangular wave $y(t)$ of mean half-period $T_2$) also does not present any difficulties, despite the irregularities of the spacings between successive instants of transition from one amplitude value of $y(t)$ to another, since these irregularities do not exceed a small fraction of the half-period $T_2$.

The third and fourth stages of the process, that is to say, the formation of $f_1$ and $f_2$ by addition and subtraction operated on $F_1$ and $F_2$ do not of course present any difficulty and are carried out by well-known means.

Preferred embodiment examples of devices for carrying out the process of the invention will now be described.

According to the present invention, there is provided a device for the identification and measurement of two unknown frequencies $f_1$ and $f_2$ contained in a complex wave $s(t)$ formed of two superimposed quasi-sinusoidal waves, the said device comprising:

a means for sampling the said wave $s(t)$ for its polarity with a repetition period $T$ such that $$pT<1/(f_1+f_2)<qT$$

$p$ with $q$ being two whole numbers such that the ratio $q/p$ is less than 2, and for thus obtaining a first series of samples, the said means being controlled by a source of timing pulses;

means for comparing the two elements of each pair of successive samples of the said series at instants separated by the time interval $T$, the said comparison means supplying a binary signal having the value 0 or the value 1 depending on whether the said samples of a pair have the same polarity or opposite polarities;

means for storing each group of $q$ of the said binary signals obtained consecutively;

the said device being characterized by:

means for forming, from each of the said groups of $q$ signals and the $p$ last obtained among the said $q$ signals in the said group, a new binary signal, the value $(S+P)$ of which is expressed by the formula $$S+P=a_{12}+a_1a_3+...+a_1a_p+\bar{a}_1\bar{a}_2\bar{a}_3...\bar{a}_q$$

(according to the rules of Boolean algebra), in which the quantities $a_1a_2a_3...a_q$ are the respective binary values of the said $q$ signals; and the quantities $\bar{a}_1, \bar{a}_2, \bar{a}_3...\bar{a}_q$ are the quantities complementary of the preceding quantities;

means for deriving from the said new signal of value $(S+P)$ an equivalent signal $y(t)$ of rectangular wave form, of which the instants of transition from one to the other of its two possible values are those at which the said value $(S+P)$ passes from 0 to 1 or vice versa;

a phase-reversing modulator having two inputs and one output, of which one of the inputs receives the said signal $y(t)$, and to the other input of which there is applied the said wave $s(t)$ across an intermediate circuit, the said modulator delivering at its output a new signal $S_1(t)$, the instantaneous amplitude of which varies between two values alternating at the frequency $F_1$ equal to $(f_1+f_2)/2$;

a first means of measuring the frequency $F_1$ of the variations of the said values of the said signals $S_1(t)$, supplying a first group of coded signals representing the value of the said frequency $F_1$;

a second means of measuring the frequency $F_2$ of the said rectangular signal $y(t)$, supplying a second group of coded signals representing the value of the said frequency $F_2$ equal to $(f_2-f_1)/2$;

and a circuit utilizing the said coded groups.

The device of the invention may comprise, in particular, as utilization circuit, means of forming the quantities $(F_1+F_2)$ and $(F_1-F_2)$ and displaying in coded form the respective values $f_1$ and $f_2$ of these latter quantities representing the said two unknown frequencies; but it may generally comprise as utilization circuit any known apparatus adapted to be controlled by groups of coded signals.

According to a preferred embodiment of the invention, the said first and second means of frequency measurement are of the type described in the above-cited copending patent application.

Also according to a preferred embodiment of the invention, the said intermediate circuit comprises a sampling device controlled by the said source of timing pulses, and the said reversing modulator is built in the form of a logical EXCLUSIVE OR circuit (also called "modulo 2 adder").

Other advantages of the invention will appear better from the following detailed description and the accompanying drawings, in which:

BRIEF DESCRIPTION OF THE DRAWING

FIG. 2 shows diagrammatically a preferred embodiment of the aforesaid frequency measuring means.

DESCRIPTION OF THE PREFERRED EMBODIMENTS

Figure 1:
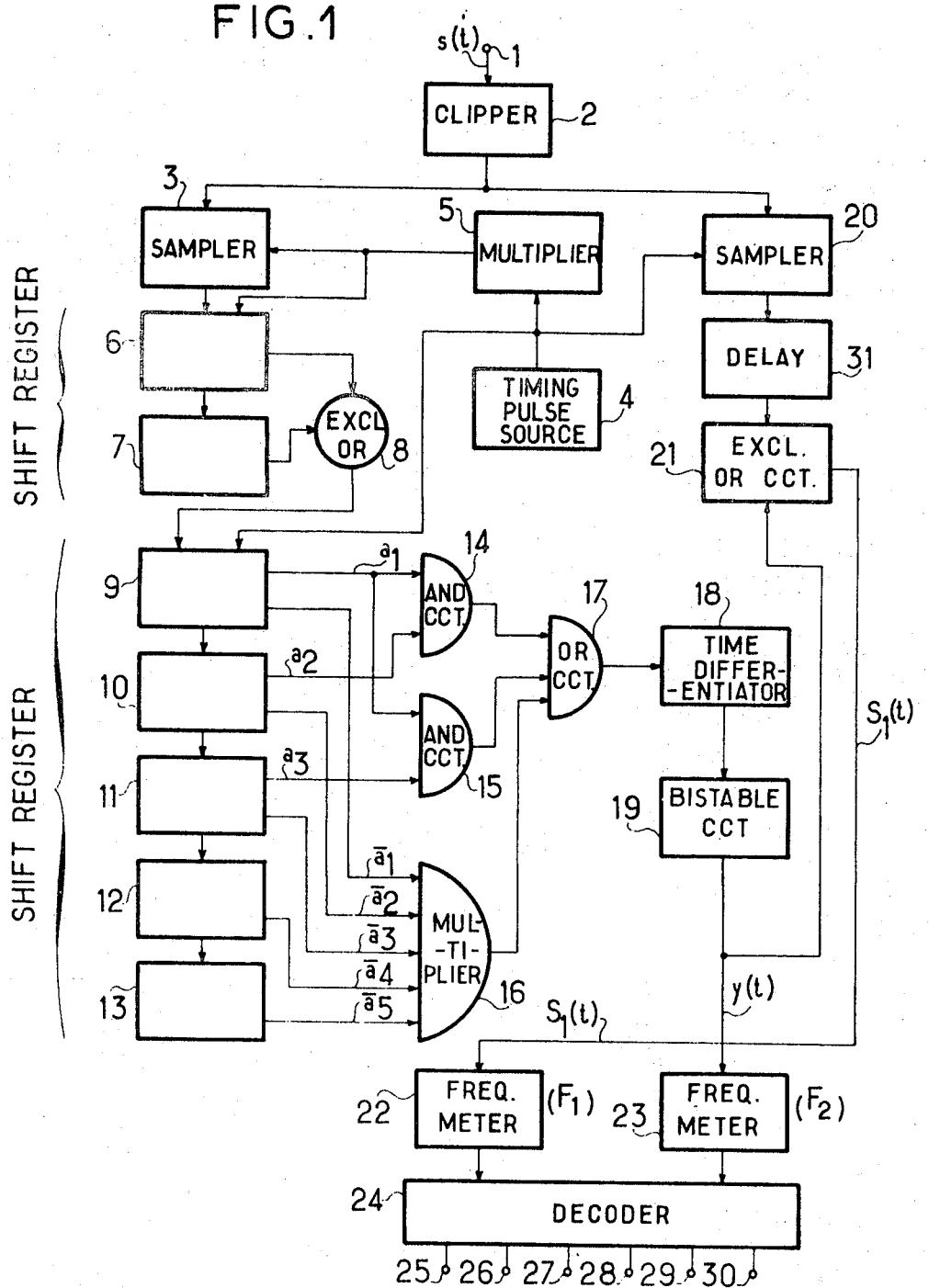
FIG. 1 shows diagrammatically a preferred embodiment of the invention.

Referring first of all to FIG. 1, the latter shows an example of putting into practice the process of the invention in the case where $p=3$ and $q=5$.

The complex wave $s(t)$ containing the unknown frequencies $f_1$ and $f_2$, received at the terminal 1, is first of all applied to a clipper 2, at the output of which it is sent to a sampling device 3, consisting for example of a balanced modulator, controlled by a source of timing pulses (clock pulses) 4, if necessary across a frequency doubler or multiplier 5.

The sampled pulses are first sent to the input of a first two-stage shift register (6, 7), the shift line of which is controlled by pulses supplied by 5 (or by 4, if the multiplier 5 is replaced by a direct connection). The respective outputs of stages 6 and 7 supply binary signals, the value of which is 0 or 1, depending on the relative polarity of the said samples. The two binary signals from 6 and 7, respectively, are applied to the two inputs of a modulo 2 adder (EXCLUSIVE OR circuit) 8, the output of which supplies a binary signal having the value 0 if the signals from 6 and 7 have the same polarity, or the value 1 in the contrary case.

The signals from 8, which are the signals denoted above by $a$, are applied to the input of a second shift register having five stages (9, 10, 11, 12, 15), each provided with two outputs, one of which supplies the signal which has just been introduced into the stage and the other the complementary signal $\bar{a}$. The two outputs of stages 9 and 11 therefore supply the signals $a_1$ and $\bar{a}_1$, $a_2$ and $\bar{a}_2$, $a_3$ and $\bar{a}_3$, respectively. For stages 12 and 13, only the outputs supplying the signals $\bar{a}_4$ and $\bar{a}_5$ are used. The progress of the signals in the register (9, 10, 11, 12, 13) is ensured by a shift line fed with the pulses from 5, as in the case of the first register (6, 7).

The value of the combination $$S+P=a_{12}+a_1a_3+\bar{a}_1\bar{a}_2\bar{a}_3\bar{a}_4\bar{a}_5$$

is obtained from the output of stages 9 to 13 by means of three multiplying circuits (14, 15, 16) (logical AND circuits) and a logical addition circuit (OR circuit) 17. The multiplying circuits 14 and 15 each have two inputs, while the multiplying circuit 16 has five inputs. Such circuits are well known in the art of logical circuits. In particular, a circuit such as 16 may be formed by the combination of several circuits similar to 14 and 15 in cascade connection.

From the output of the logical addition circuit 17, the signals of values ($S+P$) obtained are passed to the input of a time differentiator circuit 18, the output of which controls a bistable circuit 19, the output of which supplies alternately a signal 0 or 1 depending on whether its input has previously been controlled by a positive or negative pulse from 18, this pulse resulting from the differentiation with respect to time of the signal of values ($S+P$) obtained at the output of 17.

There is thus obtained at the output of 19 a signal of rectangular wave form $y(t)$, varying with the time $t$ according to the succession of the values of ($S+P$). It was explained in the foregoing how the changes in the values of ($S+P$) occur substantially at the instants of the reversal of polarity of the envelope amplitude $A(t)$ of the signal $s(t)$ received at 1.

This same signal $s(t)$, after passing through the clipper 2, is applied on the other hand to a second sampling device 20, of similar constitution to that of the element 3, fed for example directly by the clock 4. The output of 20 feeds either directly or by means of a delay device 31 one of the inputs of a "modulo 2" adder 21 to the other input of which is fed the rectangular signal $y(t)$ from 19. The output 21 supplies a new sequence of samples $S_1(t)$, the condition of which changes with the rhythm of a quasi-sinusoidal wave of frequency $(f_1+f_2)/2$, and which are no longer subjected to reversals corresponding to those of the polarity of the envelope $A(t)$.

From the output of 21, the sequence $S_1$t) is passed to the input of a numerical frequency meter 22, supplying at its output the value of the frequency $F_1$ in coded form.

Similarly, the rectangular signal $y(t)$ from 19 is passed to the input of another numerical frequency meter 23, the output of which supplies coded signals representing the numerical value of the frequency $F_2$.

If it is desired to display the values of $f_1$ and $f_2$, the latter are obtained by addition and subtraction in the apparatus 24. Alternatively, these values may be supplied in the form of coded signals to be used subsequently in any known manner for the control of other apparatus. These latter coded signals are delivered to the terminals 25, 26, 27, 28, 29, 30, the number of which depends on the application considered.

The above-mentioned delay device 31 may be of any known construction, in particular it may be a shift register having a small number of stages, providing a delay of the order of magnitude of $pT$ and controlled off 4 or 5 for reducing the time difference existing between the transitions of $y(t)$ and the changes in polarity, the said difference resulting from the delay introduced more particularly by the registers (6, 7) and (9, 10, 11, 12, 13).

As already mentioned in the foregoing, the element 21 of FIG. 1 may also consists of a phase-reversing modulator of conventional type. In this case, the sampling device 20 is not necessary and the output of 2 may be connected directly to the input of 21; the signal $y(t)$ of rectangular wave form will preferably be a signal having alternately positive and negative values, represented in simplified manner by $\pm 1$. The application to the control input of this modulator of the signal $y(t)$, at the same time as that of $s(t)$ at its signal input, will have effect of providing at the output of this modulator a wave, the polarity of which will change regularly at instants separated by time intervals $T_1$, this reconstituting the wave of frequency $F_1$ desired. frequency In the case of FIG. 1, in which the wave $s(t)$ is subjected to sampling in the device 20, and in which an EXCLUSIVE OR (modulo 2 adder) is used for 21, the phenomena are somewhat different. Assuming that the rectangular signal $y(t)$ applied to one of the inputs of the EXCLUSIVE OR circuit has alternately the values $-1$ and $+1$, the samples from 20 and applied to the other input of 21 with a definite polarity, will appear at the output of 21 with the same polarity during time intervals of length substantially equal to $T_2$, during which $y(t)$ will have the value 1, for example, alternating with other intervals during which these samples will be transmitted to the output of 21 with reversed polarity.

In the arrangement of FIG. 1, the sampling device 20 may furthermore be merged with the device 3, if there is no desire to use a sampling rhythm different for either of these devices.

Referring now to FIG. 2, the latter shows very diagrammatically a type of frequency meter of preferred pattern which may be used for the elements 22 and 23 of FIG. 1, and already described in the above-cited copending patent application.

Referring still FIG. 2, there will be seen in the latter a shift register (101, 102, 103, 104, 105) shown here, for simplification, with 5 stages only. In the case of the measurement of the frequency $F_1$, the series of samples $S_1(t)$ from the output of 21 (FIG. 1) is applied to the input 100 (FIG. 2) of this shift register, while another input 106 of the latter is that of the shift line of the same register and receiving the timing pulses supplied by 4 (FIG. 1), and ensuring the regular progress of the signals received at 100 from one stage to the next. Each of the stages 101 to 105 of the register of FIG. 2 is provided with a single output, supplying a signal 0 or a signal 1 depending on the instantaneous value of that of the samples applied to 100 which, at the instant considered, has reached the stage under consideration.

The stages of the register are associated two by two in the manner shown in FIG. 2, with spaces between their respective ranks equal to successive whole powers of the number 2. The outputs of two associated stages are respectively connected to the two inputs of an EXCLUSIVE OR circuit 111, 112 or 113, according to whether stages 101 and 102, 101 and 103, or 101 and 105 are concerned.

The outputs of 111, 112 and 113 are respectively connected to the inputs of three integrating devices 121, 122, 123. These devices, of known conventional structure, work out the time average of the signals received at the outputs of 111, 112, 113 and transmit the mean values thus obtained respectively to 131, 132, 133 as a coded group which may be used for controlling any subsequent apparatus.

A device similar to that of FIG. 2 is equally well applicable to the construction of the element 23 in FIG. 1, providing the value of $F_2$, as it is to the element 22 in the same FIG. providing the value of $F_1$. The means whereby the values $f_1$ and $F_2$, respectively equal to the sum and difference of $F_1$ and $F_2$, are obtained are well known in the art of logical circuits and do not require to be described in detail here. However, in the case where a device similar to that of FIG. 2 is employed for the element 23, the latter should be completed, before the application of signals from the element 19 to the input 100 of the register 101 to 105 of FIG. 2, by a sampling device, which may be controlled directly or indirectly by the source of timing pulses 4 (FIG. 1).

One of the advantages of the use of a device of the type of FIG. 2 for the construction of the element 22 is precisely that it utilizes directly the samples from the element 21 without any other sampling being necessary.

It is recalled here that the accuracy in the measurement of the frequency obtained by means of a device of the type of FIG. 2 is essentially related to the duration of the sampling interval $T_o$ of the signals applied to its input, and the number $(k+1)$ of stages of the register; in fact, this accuracy is equal to the reciprocal of the quantity $2^{k+1}T_o$), in which $T_o$ may have the same value as $T$ or may be a multiple or submultiple of the latter. In the case of FIG. 2, the register having 5 stages, three significant binary FIGS. are obtained for the measured frequency, but it is of course possible to obtain a larger number of FIGS. with a register having a large number of stages.

When the coded signals representing the identified frequencies have been obtained at the outputs of the elements 22 and 23 of FIG. 1, they may be subsequently used for the control of any other logical elements, for example for that of a decoder causing other signals to appear at different terminals according to the particular combination of two frequencies taken from a larger number of frequencies for the control of relays, each of which corresponds to a particular combination of frequencies, etc. In particular, the element 24 of FIG. 1 may be such a decoder.

The simple type of frequency meter shown diagrammatically in FIG. 2 is not, however, the only one which may be used for the elements 22 and 23 of FIG. 1. More elaborate systems, comprising for example majority decision elements relative to the values of the signals from 111, 112, 113 (FIG. 2) may also be employed.

Other known types of numerical frequency meters may, of course, be equally well utilized, provided they make it possible to display in numerical form the periodic variations in the values of the samples from the element 21 of FIG. 1 and the mean frequency of the rectangular signal $y(t)$ from the element 10 of the same FIG.

With regard to the element 24 of FIG. 1, it may be remarked that it is not necessary to provide therein explicitly the values of $f_1$ and $f_2$ when it is desired to use the identification of these frequencies $f_1$ and $f_2$ for the control of other devices from the terminals 25 to 30. In fact, the knowledge of the frequencies $F_1$ and $F_2$ in numerical form is basically equivalent to that of the frequencies $f_1$ and $f_2$, and it is also equally possible to use the coded signals representing $F_1$ and $F_2$, supplied by 22 and 23, for the direct control of devices such as a decoder sending auxiliary signal to a particular one of a certain number of utilization circuits, or controlling a relay putting this particular circuit into service, from the coded combination revealing the simultaneous presence of $F_1$ and $F_2$.

A numerical example will now be given for the case where the frequencies $f_1$ and $f_2$ are voice frequencies. Assuming the possible frequencies to be seven in number, with the values already mentioned of 1500, 1650 and 1800 c/s on the one hand, and 2200, 2350, 2500, and 2650 c/s on the other hand, it is possible to form 12 combinations of two frequencies $f_1$ and $f_2$, taken from the preceding frequencies and such that the half-sum of two of the said frequencies remains between 1850 and 2225 c/s, while their half-difference remains between 275 and 575 c/s. The combinations thus formed satisfy the above-mentioned condition that the quantity $T_2$ should have a value equal to several times that of the quantity $T_1$. In fact, it is possible to arrange for $T_1$ to be always comprised between 225 and 270 microseconds and $T_2$ between 870 and 2500 microseconds, with a ratio $T_2/T_1$ always greater than 3 and at the most equal to 10.

Then, selecting $T=62.5$ microseconds, the conditions (6) mentioned in the foregoing is verified by taking $p=3$ and $q=5$. The numerical frequency meters 22 and 23 of FIG. 1, assumed to be of the type of FIG. 2, may then use a sampling period $T_o$ equal to $T$, but it is also possible to take for $T_o$ a value equal to twice the preceding value, say 125 microseconds, because high accuracy in the measurement of the frequencies $F_1$ and $F_2$ is not necessary, due to the fact that they can only assume a certain number of predetermined discrete values.

With the numerical values thus specified, it is possible to ensure in a telephone signalling system the control of a decoder selecting one utilization circuit out of 12 such circuits from coded signals obtained at the outputs of the elements 22 and 23 of FIG. 1, this decoder then replacing the element 24 of this latter FIG.

I claim:
1. A device for the measurement of two different frequencies simultaneously present in a complex wave, comprising:
   a receiving terminal for receiving said wave;
   a timing pulse source delivering periodic pulses with a constant repetition period;
   a first and a second sampler each having an input and an output and both controlled by said pulse source, and means for connecting said terminal to the inputs of both said samplers;
   a first shift register including at least two stages and having a shift line fed from said pulse source;
   means for connecting the output of said first sampler to the input of the first stage of said first register;
   an EXCLUSIVE OR circuit having two inputs respectively fed from one and the other of two consecutive stages of said first register;
   a second shift register having a shift line fed from said pulse source and including a plurality of stages, to the input of the first stage of which is connected the output of said EXCLUSIVE OR circuit;
   a plurality of AND circuits all having a first input fed from the first stage of said second register and each having a second input fed from a different one of the further stages of said second register;
   a multiplier circuit having a plurality of inputs respectively fed from said first and further stages of said second register;
   an OR circuit having a plurality of inputs respectively fed from the outputs of said AND and multiplier circuits;
   a time differentiator circuit having an input fed from the output of said OR circuit and an output;
   a bistable circuit controlled by said output of said OR circuit;
   a first and a second frequency meter respectively measuring on one hand the frequency of signals delivered from the output of said second sampler through a delay circuit followed by another EXCLUSIVE OR circuit having a first input fed from said delay circuit and a second input fed from said bistable circuit, and on the other hand the frequency of the signals directly delivered by said bistable circuit, said frequency meters respectively delivering the measurement of latter said frequencies in the form of a first and a second coded signal group; and
   and decoder means of additively and subtractively combining said coded groups and displaying in coded form the values of said first-named two different frequencies.

2. A device as claimed in claim 1, in which at least one of said samplers is controlled from said timing pulse source through a frequency multiplier circuit.

3. A device as claimed in claim 1, in which said means for connecting said terminal to said inputs of said samplers include a clipper circuit.